United States Patent [19]
Galtz

[11] Patent Number: 4,519,375
[45] Date of Patent: May 28, 1985

[54] HOT-AIR HEATER

[75] Inventor: Rüdiger Galtz, Munich, Fed. Rep. of Germany

[73] Assignee: Webasto-Werke W. Baier GmbH & Co., Gauting, Fed. Rep. of Germany

[21] Appl. No.: 579,942

[22] Filed: Feb. 14, 1984

[30] Foreign Application Priority Data

Mar. 23, 1983 [DE] Fed. Rep. of Germany ....... 3310501

[51] Int. Cl.³ ............................................. F24H 3/02
[52] U.S. Cl. .............................. 126/110 B; 126/116 R
[58] Field of Search ........... 126/110 B, 110 R, 110 C, 126/116 R, 116 A; 431/186, 188; 237/12.3 C; 415/52

[56] References Cited

U.S. PATENT DOCUMENTS

| | | | |
|---|---|---|---|
| 3,779,229 | 12/1973 | Volbehr | 126/110 B |
| 3,989,029 | 11/1976 | Friedl et al. | 126/110 B |
| 3,989,030 | 11/1976 | Friedl | 126/110 R |
| 4,439,095 | 3/1984 | Galtz et al. | 415/52 |

FOREIGN PATENT DOCUMENTS 1927375  12/1970  Fed. Rep. of Germany ... 126/110 B Primary Examiner—James C. Yeung
Attorney, Agent, or Firm—Sixbey, Friedman and Leedom

[57] ABSTRACT

A hot-air heater, especially for vehicles, having a burner disposed in a housing, a fuel supply means for delivering fuel to the burner and a combustion-air fan for feeding combustion-air to said burner. Combustion-air, exhaust-gas and heating-air ducts are constructed within the housing. The housing has an opening for providing access to at least one space in which adjustable and/or replaceable parts are situated, the space being closable, relative to the outside of the heater, by means of a housing cover, and being connected to at least one of the combustion-air and exhaust-gas ducts. For reasons of safety, a combustion-air exhaust opening is provided on the pressure side of the combustion-air fan, which is blocked only when a housing cover for the housing access opening is in place, and being dimensioned in such a way that, when the combustion-air exhaust opening is not blocked, sufficient combustion-air is exhausted therethrough such that operation of the heater is not possible.

10 Claims, 5 Drawing Figures

HOT-AIR HEATER

BACKGROUND AND SUMMARY OF THE INVENTION

This invention relates to a hot-air heater, especially for vehicles, having: a burner disposed in a housing and being fed with free-flowing fuel and, via a combustion-air fan, with combustion air; combustion-air, exhaust-gas and heating-air ducts constructed within said housing; and at least one space which, by means of a housing cover, can be closed off to the outside, said space being connected to at least one of the combustion-air and exhaust-gas ducts.

Heaters of this type are known, for example, from U.S. Pat. Nos. 3,989,029 and 3,989,030. After the housing cover is removed, the heater parts, such as a glow plug, a flame monitor or an adjustable throttling member, become accessible for an adjustment of the output of the combustion-air fan. The housing cover provides a tight closure in order to prevent exhaust-gas and/or combustion-air from escaping to the outside of the heater (except for exhaust-gas leaving via the exhaust pipe), so that it will not be conveyed, either directly or together with the heating-air conveyed, to the passenger area. This is especially important in the case of heaters intended for mounting inside of a vehicle. In this connection, the above-mentioned characteristic that the space that can be closed off to the outside by means of the cover is connected with the combustion-air and/or the exhaust-gas duct, must be understood in the widest sense. It must especially, also, apply to the situation where the mentioned space is normally closed off with respect to the combustion-air and exhaust-gas ducts, but exhaust-gas can penetrate into this space through leakages, for example, in the area of the glow plug thread.

In practice, there is the danger that a housing cover, that has been removed for maintenance or repair purposes, is, by mistake, not placed back on the housing. The exhaust-gas can then reach the passenger area (when the heater is used for vehicles) or another area that is to be heated and where people may be present and can be poisoned.

The invention, therefore, has a principle object of creating a hot-air heater of the initially-mentioned type where, in a simple and reliable manner, the possibility of people being injured, when the housing cover is erroneously not placed back on the housing, is avoided.

According to preferred embodiments of the invention, this object is achieved by the fact that, on the pressure side of the combustion-air fan, a combustion-air exhaust opening is provided which is blocked only when the cover is closed and is dimensioned in such a way that, when the combustion-air exhaust opening is not blocked, operation of the heater is not possible.

If, in the case of the hot-air heater according to the invention, the housing cover erroneously is not placed back on the housing after a maintenance or repair operation, so much combustion-air is let out that the heater cannot be operated and no exhaust-gases are produced containing toxic substances.

In accordance with further aspects of the invention, the combustion-air exhaust opening may be blocked by a part of the cover itself. A component that is used for fastening of the cover may also be used for the blocking of the exhaust opening, instead of the cover part.

As an additional safety measure, the combustion-air exhaust opening may have a cross section that is not circular. This would prevent that, when the cover is lost, for example, the heater is operated by closing the exhaust opening by means of a commercially available stopper or similar means.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
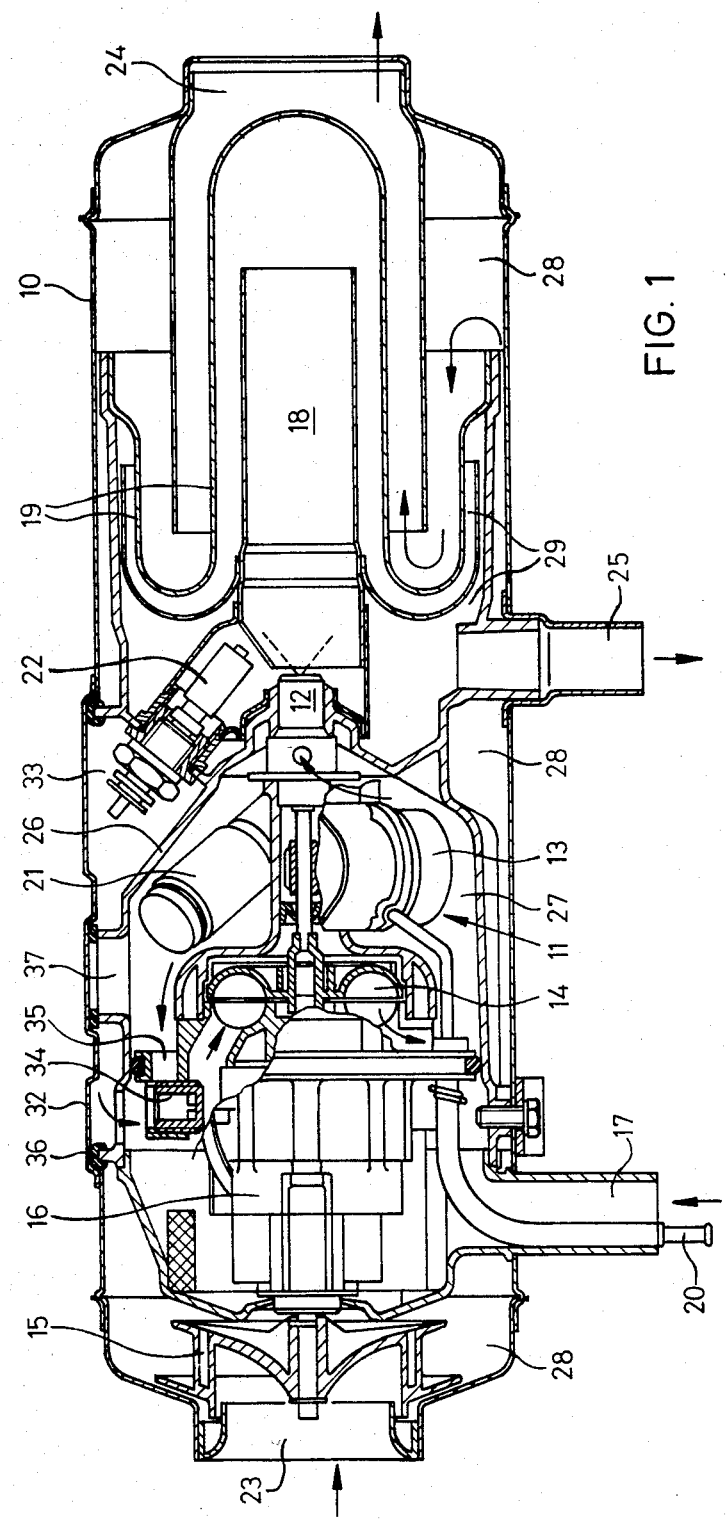
FIG. 1 shows a longitudinal section through a hot-air heater of a vehicle according to the present invention.

The hot-air heater according to FIG. 1 has a housing which, as a whole, is designated by the number 10, and in which a burner unit, indicated generally by numeral 11, is housed. The burner unit 11 essentially comprises an atomization device 12, as well as a fuel pump 13, a combustion-air fan 14 and a heating-air fan 15. Fans 14 and 15 are driven jointly by an electric motor 16. A mixture of combustion-air, taken in by the combustion-air fan 14 via a combustion-air connection piece 17, and atomized fuel is delivered by the atomization device 12 to a pipe-shaped combustion chamber 18 that is surrounded by a heat exchanger 19. In this case, the liquid fuel is taken in by the fuel pump 13 via a fuel supply line 20 and, via a solenoid valve 21, is conveyed to the atomization device 12. A glow plug 22 is used for igniting the combustion-air/fuel mixture. Heating-air enters the heater via an opening 23 and, after being heated by means of the heat exchanger 19, leaves the heater via an opening 24. Exhaust-gas leaves the combustion chamber 18 and the heat exchanger 19 via an exhaust pipe 25.

The burner unit 11 is housed in a burner housing 26 situated within heater housing 10. The combustion-air flows through the combustion-air duct 27, formed by the interior of the burner housing 26. A heating-air duct 28 extends from the opening 23 to the opening 24. The combustion chamber 18 and the heat exchanger 19 delimit an exhaust-gas duct 29.

A housing cover 32 closes off a space 33 where the end of the glow plug 22, that is located away from the combustion chamber 18, is disposed.

In addition, a throttling member 34 is accessible via the space 33, said throttling member 34 being disposed in a bypass duct 35 connected with the delivery outlet of the combustion-air fan 14, as described in detail in pending application Ser. No. 447,186, filed Dec. 6, 1982, of which I am a co-inventor, and which, to the extent it may be necessary to complete an understanding of the present application, is hereby incorporated by reference. Exhaust-gas can reach the space 33 through leakage points in the area of the glow plug 22 and, perhaps, through a return flow of exhaust-gas from the combustion chamber 18. In the closed condition shown in FIG. 1, the cover 32 prevents exhaust-gas from escaping from the space 33 toward the outside of the housing 10 so as to avoid the possibility that it might mix with the heating-air taken in via the opening 23 or enters directly into the passenger area. For obtaining a sealing between the cover 32 and the housing 10, a sealing means 36, such as a gasket seal, is provided. A combustion-air exhaust opening 37 is provided in the burner housing 26 on the pressure side of the combustion-air fan 14. When the cover 32 is in position, the opening 37 is tightly sealed by a sealing ring 38 that is carried by the cover 32.

When the housing cover 32 is removed, for example, in order to exchange the glow plug 22 or to adjust the throttling member 34, the exhaust opening 37 is unblocked. The opening 37 is sufficiently large as to let off so much combustion-air, when it is not closed, that operation or start-up of the heater is not possible. Consequently, the heater can only be operated again after the cover 32 has been placed back in position closing off the exhaust opening 37.

Figure 2:
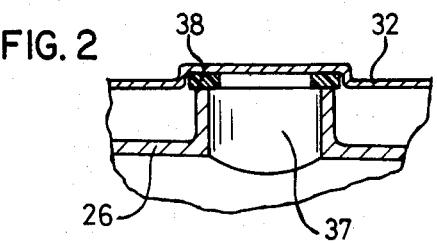
FIG. 2 shows a portion of the heater according to FIG. 1, on an enlarged scale, in the vicinity where the combustion-air exhaust opening is closed by means of the cover of the housing.
Figure 2A:
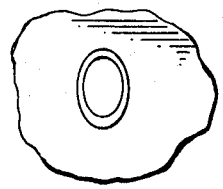
FIG. 2a is a top view of an exhaust opening of non-circular cross section.

As illustrated in FIG. 2a, the combustion-air exhaust opening 37 may have a non-circular cross section. This provides an extra measure of safety, since it prevents closing off of the opening 37 by means of a commercially available stopper, screw or similar means instead of by use of the cover 32.

Figure 3:
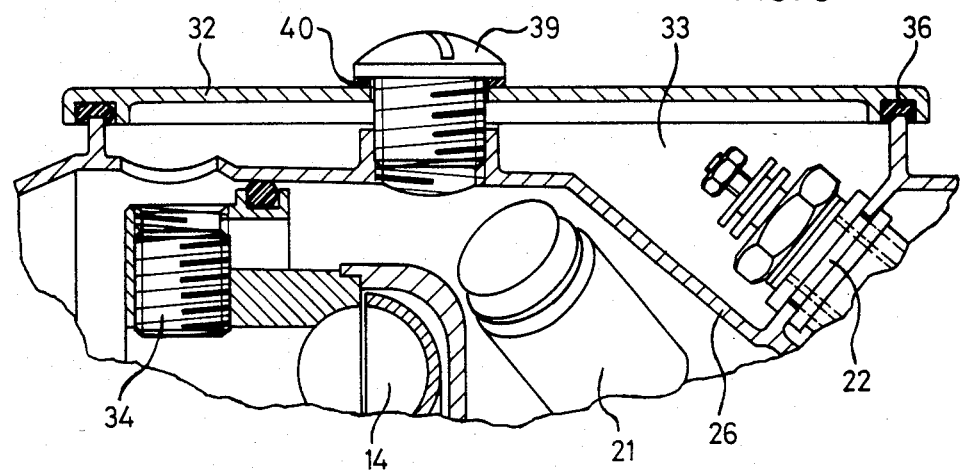
FIG. 3 shows a partial view of a modified embodiment of the heater in the area where the combustion-air exhaust opening is blocked by a screw used for the fastening of the cover.

In the case of the modified embodiment according to FIG. 3, the exhaust opening 37 is provided with an internal thread into which a screw 39, used for holding a cover 32' in place, is screwed. A sealing ring 40 is located between the head of the screw 39 and the cover 32' in order to ensure that exhaust-gases do not leak out between the screw 39 and the wall of the hole in the cover 32' through which it passes.

Figure 4:
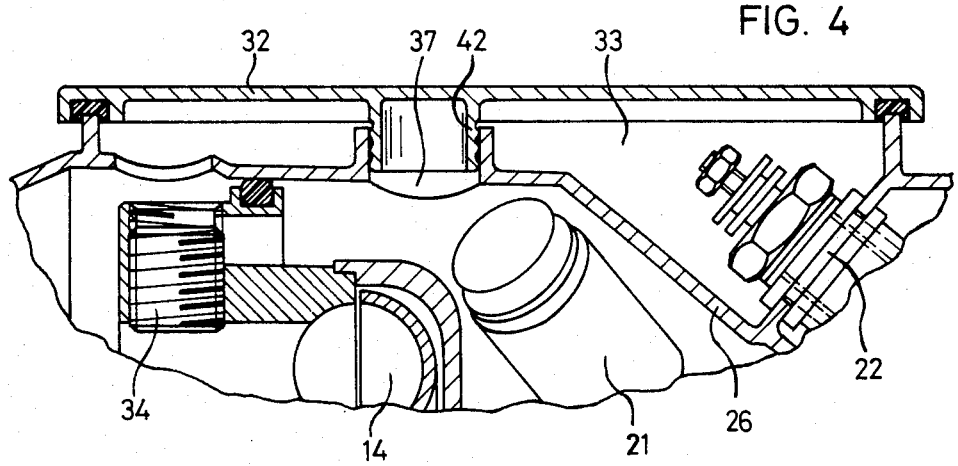
FIG. 4 shows a view corresponding to FIG. 3, of a further modified embodiment of the invention.

In the case of the embodiment according to FIG. 4, a sealing stopper 42 is shaped onto the inside of a housing cover 32". The sealing stopper 42 closes the exhaust opening 37 when the cover 32" is in position. Stopper 42 has its periphery sized and shaped so as to ensure that it is received within opening 37 with sufficient snugness to hold the cover in place in a manner obtaining a leak-free seal, yet also enable repeated removal and attachment of the cover 32". For this purpose, the periphery of stopper 42 may be provided with a ribbed or corrugated surface, as shown. The stopper should cross-sectionally correspond in shape with the opening 37, whether or not exhaust opening 37 is of circular cross section.

While I have shown and described various embodiments in accordance with the present invention, it is understood that the same is not limited thereto, but is susceptible of numerous changes and modifications as known to those skilled in the art, e.g., control devices required for operation of the system and/or a flame monitor may, additionally, be situated within the space 33 and covered by the housing cover. I, therefore, do not wish to be limited to the details shown and described herein, but intend to cover all such changes and modifications as are encompassed by the scope of the appended claims.

I claim:

1. A hot-air heater, especially for vehicles, having a burner secured in a housing, a fuel supply means for delivering fuel to said burner and a combustion-air fan for feeding combustion-air to said burner; combustion-air, exhaust-gas and heating-air ducts being constructed within said housing; a glow plug, said housing having an opening providing access to at least one space that is connected to at least one of the combustion-air and exhaust gas ducts and in which at least said glow plug is situated, a housing cover for closing said space relative to the outside of the heater and which also encloses said plug relative to the exterior of said heater; wherein, on the pressure side of the combustion-air fan, a combustion-air exhaust opening is provided which communicates with said combustion air duct and is blocked from communication with the outside of the heater only when the housing cover is fastened in place closing said space, and which is dimensioned in such a say that, when the combustion-air exhaust opening is not blocked, sufficient combustion air is exhausted therethrough exteriorly of the heater so that operation of the heater is not possible.

2. A hot-air heater according to claim 1, wherein the combustion-air exhaust opening is blocked, when said housing cover is in place, by means of a part of the cover itself.

3. A hot-air heater according to claim 1, wherein the combustion-air exhaust opening is blocked, when said housing cover is in place, by means of a component used for the fastening of the cover.

4. A hot-air heater according to claim 3, wherein said component is a screw and said exhaust opening is threaded for receiving said screw.

5. A hot-air heater according to claim 4, wherein a sealing ring is disposed between a head of the screw and the housing cover.

6. A hot-air heater according to claim 3, wherein said component is a plug formed on said cover and said exhaust opening is sized for snuggly receiving said plug.

7. A hot-air heater according to claim 6, wherein the periphery of said plug is provided with ribs, corrugations, or the like.

8. A hot-air heater according to claim 1, wherein the combustion-air exhaust opening has a cross section that is not circular.

9. A hot-air heater according to claim 2, wherein the combustion-air exhaust opening has a cross section that is not circular.

10. A hot-air heater according to claim 3, wherein the combustion-air exhaust opening has a cross section that is not circular.

* * * * *